United States Patent [19]

Langewis et al.

[11] Patent Number: 4,786,768
[45] Date of Patent: Nov. 22, 1988

[54] MANUAL CURSOR ACTUATOR FOR ELECTRONIC KEYBOARDS

[75] Inventors: Cornelis Langewis, Walnut Creek; Christiaan Langewis, Hayward, both of Calif.

[73] Assignee: Interlock, Hayward, Calif.

[21] Appl. No.: 87,715

[22] Filed: Aug. 20, 1987

[51] Int. Cl.[4] ........................ A63F 9/00; H01H 25/00
[52] U.S. Cl. ............................... 200/6 A; 200/330; 235/146; 273/85 G; 273/148 B; 340/709
[58] Field of Search ............... 200/5 A, 6 A, 17 R, 200/18, 330, 153 K; 235/145 R, 140; 400/472, 473; 273/DIG. 28; 340/709

[56] References Cited

U.S. PATENT DOCUMENTS 4,575,591  3/1986  Lugaresi ..................... 200/330 X

FOREIGN PATENT DOCUMENTS

54-121852  9/1979  Japan ..................... 273/DIG. 28

Primary Examiner—J. R. Scott
Attorney, Agent, or Firm—Townsend and Townsend

[57] ABSTRACT

Arrow keys on the keyboard of a desktop computer, computer terminal or displaywriter which control the movement of a cursor are actuated by a manually operated mechanical device resting over the keyboard. The device entails a central control shaft and a plurality of fingers extending outward radially from the shaft toward each of the arrow keys, and preferably toward adjacent keys as well. The control shaft and fingers are pivotally mounted and arranged such that when the control shaft is pivoted in the direction of desired motion of the cursor, the appropriate finger is engaged by the control shaft and pivots downward to depress the corresponding key.

14 Claims, 8 Drawing Sheets

MANUAL CURSOR ACTUATOR FOR ELECTRONIC KEYBOARDS

BACKGROUND OF THE INVENTION

This invention relates to electronic keyboards. and particularly to the operation of keyboards used to enter text or data into a machine such as, for example, personal computers, computer terminals, and display-writers.

To the computer literate, the cursor is one of the most important characters displayed on the computer screen. The cursor is the blinking character which is moved around the screen and identifies where keyboard entries will be displayed and command inputs will be entered.

Movement of the cursor about the screen is achieved through a variety of keys on the keyboard. These include four arrow keys, one for each of the four directions—up, down, left and right. These keys move the cursor one character position at a time in the selected direction, although successive shifts of the cursor can be achieved by holding an arrow key down. The arrangement of the arrow keys varies from one type of machine to the next. In some cases, the arrow keys are arranged in a square; in others an inverted "T". The common arrangement for computer keyboards is a cross ("+"), with one arrow key at each point of the cross.

On computer keyboards, the arrow keys are part of the number pad on the righthand end of the keyboard, forming a cross on the keys bearing the numbers 2, 4, 6 and 8. Further keys adjacent to arrow keys provide for gross movement of the cursor. These include the "End," "Home," "PgUp," and "PgDn" keys, which also bear the numbers 1, 7, 9 and 3, respectively. Since the numbers 1 through 9 form a 3×3 square in this arrangement, the cross formed by the arrow keys has the number 5 key at its center, and the "End," "Home," "PgUp" and "PgDn" keys at the four corners, respectively.

Use of the arrow keys to move the cursor entails a risk of mistakes, since one can easily press a key adjacent to the one intended, whether it be another arrow key, a key outside the arrow key group, such as one of the gross movement keys, or the center (5) key in a cross arrangement. An operator who is working quickly may not notice the error until after having entered additional data. Once the error is noted, considerable time may have been lost and additional time will be needed to make the necessary corrections.

A variety of solutions to the problem are in existence. These solutions are various types of pointing devices which add circuits, parts and/or software to the system for use in place of the arrow keys. One such device is a "mouse," which is a small box-like device which is placed close by on the user's desk. The user pushes the mouse in the direction of the desired cursor movement. A disadvantage of this device is that it requires the user to move his or her hand away from the keyboard entirely to achieve cursor movement. Unfortunately, this device requires an appropriate jack on the computer for the connector of the mouse to plug into. In addition, it usually requires special circuitry in the computer, and special software to interpret the electrical signals which replace the normal arrow key signals.

Another such device is an electromechanical "joystick," This device has a lever which when moved in either right, left, forward or backward positions produces an equivalent movement of the cursor. This has the advantage of providing a more intuitive relationship between the action of the user's hand and the resultant effect. Like the mouse, however, the joystick requires an appropriate connector and jack as well as special circuitry and software.

Utility software does exist which interprets signals from such devices as the mouse and joystick. Such software is generally difficult to implement, however, and is often not supplied with the device. Furthermore, most application software is not organized to accept inputs from the utility software which interprets mouse or joystick activity, since application software is usually conditioned to accept only keyboard input and is virtually impossible for the end user to alter. This detracts considerably from the utility and versatility of these devices. A still further disadvantage of some joysticks or mouse devices is their inability to depress keys or perform functions like the "End," "Home," "PgUp" and "PgDn" functions.

SUMMARY OF THE INVENTION

The present invention resides in a manual cursor actuator which, through the use of a control shaft and an arrangement of fingers corresponding to the arrow keys, provides the intuitive joystick style of moving a cursor without adding or altering any electrical connections and without the need for adding or altering any programs in the computer. The fingers and control shaft are mounted in a housing which fits over the arrow keys on the keyboard with the fingers in alignment with the keys. The control shaft and the fingers are arranged to co-act such that manual movement of the control shaft in the manner of a joystick causes the fingers to depress the arrow keys individually, the depressed key corresponding in direction to the direction of movement of the control shaft.

In preferred embodiments, the actuator further contains fingers for the gross movement corner keys ("End," "Home," "PgUp" and "PgDn"), as well as the capability of depressing the center ("5") key.

The device includes a mount which enables one to place it directly over the keyboard in a stable manner with the fingers in alignment with the arrow keys the mount preferably adjustable to keyboards of different configurations.

The fully mechanical nature of the device offers distinct advantages. For example, the device does not require electrical connections or the installation of circuit boards, ports or connectors, nor does it require one to add or alter programs in the computer. The device is easy to install and remove, simple and intuitive in operation, and inexpensive to manufacture. Also, it is fully transferable among many keyboards of different types with similar arrow key arrangement. Further advantages, features and preferred embodiments will be evident from the following description. In general, however, the device is useful in all applications where a cursor is used, including data input in the form of alphanumeric characters (text, numbers and symbols) as well as the manipulation of figures on a screen as in computer games.

BRIEF DESCRIPTION OF THE DRAWINGS

FIGS. 5a, 5b and 5c are views of the lower portion of the housing of the embodiment shown in FIG. 4, 5a representing a top view, 5b a bottom view, and 5c a sectional view taken along the lines C—C of FIG. 5a.

FIGS. 7a, 7b and 7c are views of the upper portion of the housing of FIG. 4, FIG. 7a representing a top view, FIG. 7b a bottom view, and FIG. 7c a sectional view taken along the lines C—C of FIG. 7a.

FIG. 8 is a sectional view of another embodiment of the invention, taken along line 8—8 of FIG. 2.

FIGS. 9a, 9b and 9c are views of the lower portion of the housing shown in the embodiment of FIG. 8, representing top, bottom and sectional views, respectively, the latter taken along line C—C of FIG. 9a.

FIGS. 11a, 11b and 11c are views of the upper section of the housing shown in FIG. 8, representing top, bottom and sectional views, respectively, the latter taken along the line C—C of FIG. 11a.

DETAILED DESCRIPTION OF THE INVENTION AND PREFERRED EMBODIMENTS

Figure 1:
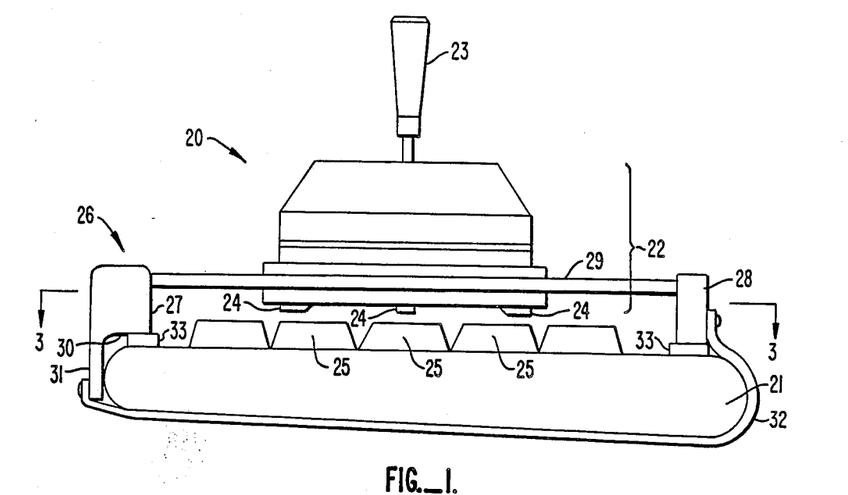
FIG. 1 is an illustration of one embodiment of the present invention, shown in side elevation.

FIG. 1 depicts a manually operated actuator 20 in accordance with the present invention. The actuator is shown in position over a keyboard 21 such as that found on desktop computers, computer terminals, and displaywriters. The actuator consists of a housing 22, with a control shaft 23 extending upward through an opening in the top of the housing, and various fingers 24 extending downward from the bottom. The fingers are in alignment with individual keys 25 on the keyboard. The fingers, as the subsequent figures will show, correspond to the arrow keys and, in some embodiments additional keys as well.

The housing 22 is supported above the keyboard by a mounting rack 26, which consists of forward and rear bars 27, 28 supporting a pair of parallel rails 29, only one of which is visible in this view. The rails engage the sides of the housing 20, lying in a groove in each side so that the housing is slidable along the rails. The fit of each groove will be tight enough however to prevent inadvertent sliding. The rear bar 28 rests on the flat surface of the keyboard in an area behind the keys. The forward bar 27 has a shoulder 30 which rests on the flat surface at the front of the keyboard, and a downward extension 31 which hooks over the front edge, aligning the mounting rack perpendicular to the key rows and stabilizing it. An elastic band 32 affixed to the forward and rear bars passes around the underside of the keyboard 21 to hold the rack in place. An alternative is a non-elastic strap secured by a buckle. The forward and rear bars may also include rubber feet 33 as a means of preventing slippage of the rack along the keyboard. Height adjustment of the mounting rack may be provided by using adjustable rubber feet or shims or substitute rubber feet of varying thicknesses. As an alternative, each side of the housing may include two or three parallel grooves (also not shown) rather than just one to support the housing at different heights or by having the rails 29 movable within the forward and rear bars 27, 28.

Figure 2:
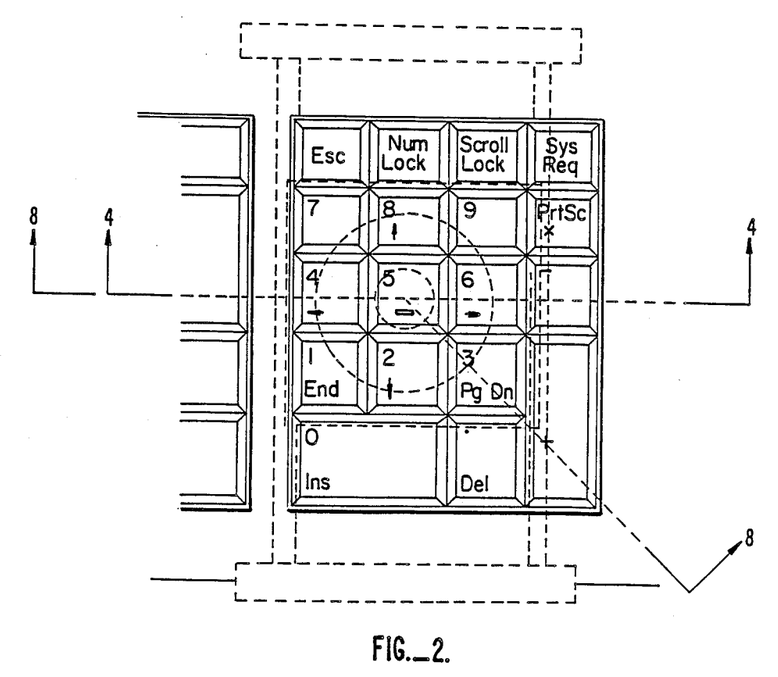
FIG. 2 is an illustration of a typical keyboard section containing arrow keys, to which the present invention may be applied.

FIG. 2 shows the number pad on a typical personal computer keyboard over which the actuator of the present invention is placed for use. The position of the actuator is shown in dashed lines. The arrow keys are included in the number pad in a common arrangement. The arrow keys are arranged in the form of a cross (i.e., "+" sign). These are the same keys bearing the numbers 2, 4, 6, and 8. The center of the cross is occupied by the 5 key and the corners are occupied by the "End," "Home," "PgUp" and "PgDn," beginning at the lower left and proceeding around clockwise.

Figure 3:
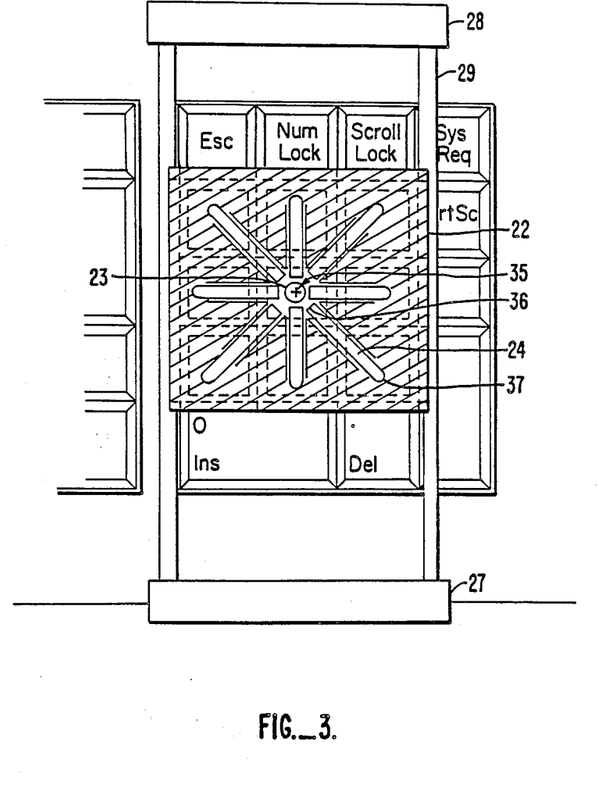
FIG. 3 shows the embodiment of FIG. 1 in position over the keyboard shown in FIG. 2, with the housing of the device shown in sectional manner taken along the lines 3—3 of FIG. 1.

The same view is shown in FIG. 3, with the actuator shown in solid lines, and the housing shown in cutaway to represent the view along the line 3—3 of FIG. 1 so that the positions of the fingers with respect to the underlying keys are visible. The housing has a center line 35 perpendicular to the plane of the drawing and to its longitudinal and lateral axes. In this specification, the term "longitudinal" will refer to the axis running in the top-to-bottom direction in FIG. 3 while the term "lateral" will refer to the axis running side-to-side.

The control shaft 23 (see FIG. 1) is positioned with its center axis running along the center line 35. As explained below, the control shaft is pivotally mounted to permit deviation from the center line, but it is preferably biased to return to the center line upon release. The grip portion of the shaft may assume a variety of shapes. The shape shown in the drawing is that of a stick; a ball or a circular knob are other examples.

The fingers 24 which contact the keys are mounted in the housing and extend radially from the center line 35, each finger having an inner end 36 closest to the center line and an outer end 37 furthest away. The outer ends are in alignment with the various keys which they are intended to depress. As will be seen from the subsequent drawings, the fingers are diagonally mounted in a pivotal manner such that when the control shaft 23 pushes the inner ends 36 outward, the outer ends 37 rotate downward to depress the corresponding key.

The finger arrangement shown in FIG. 3 includes two fingers in the longitudinal direction, two in the lateral, and two in each of the two diagonal directions. This is but one of a variety of arrangements possible in accordance with the present invention, depending on the cursor key arrangement on the keyboard as well as the functions sought to be incorporated into the actuator. FIGS. 4 through 7 illustrate in detail an actuator in accordance with the invention in which only the longitudinal and lateral fingers are included.

Figure 4:
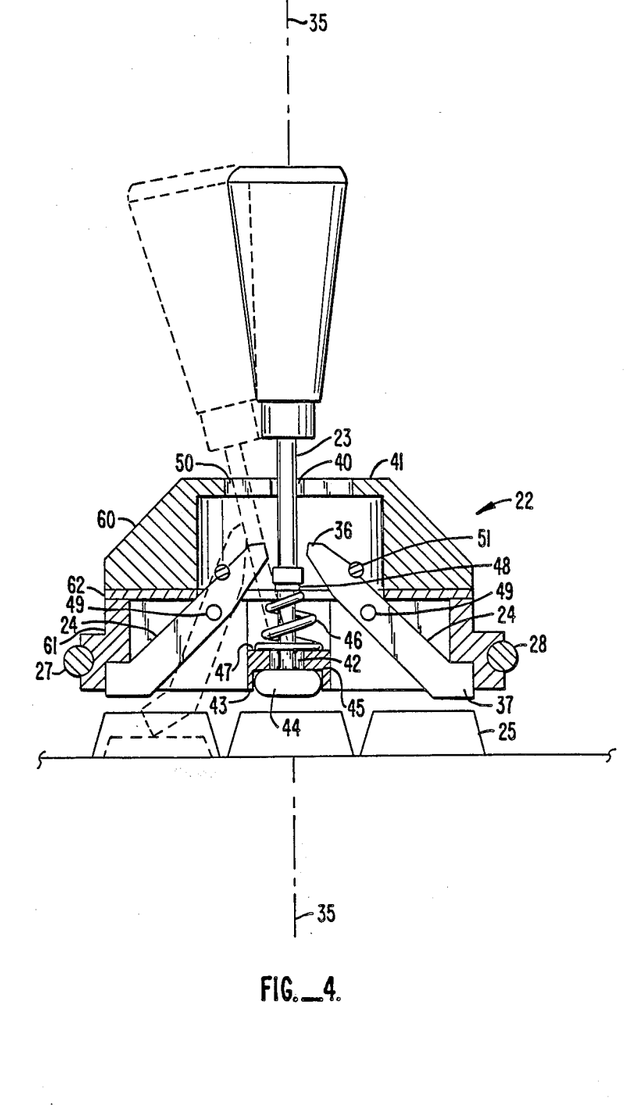
FIG. 4 is a sectional view of one embodiment of the invention taken along the lines 4—4 of FIG. 2.

The view in FIG. 4 is taken along the line 4—4 in FIG. 2. The control shaft 23 extends into the interior of the housing 22 through an opening 40 in the upper surface 41 of the housing. The lower end of the control shaft 23 passes through an opening 42 in the bottom surface 43 of the housing and terminates in a knob 44 at its base. The knob 44 rests on an inverted shoulder 45 encircling the opening 42. A coil spring 46 surrounding the control shaft 23 is compressed between an internal ledge 47 in the housing and a flange 48 on the control shaft to force the knob 44 up against the inverted shoulder 45, thereby holding the control shaft in place.

The upper surface of the knob 44 which is forced against the internal ledge 47 is flat in this embodiment. This is a preferred shape since it ensures the return of the control shaft to the vertical position (aligned with the center line of the housing) when it is released. A generally spherical shape as shown in one of the subsequent drawings may be used instead, however.

The coil spring 46 permits vertical movement of the control shaft 23 along the center line of the actuator by compressing the spring along its axis, as well as pivoting of the control shaft radially from the center line (as shown, for example, in dashed lines) by bending the spring sideways. In each case, the coil spring returns the control shaft to the position shown in solid lines upon release. Vertical movement of the control shaft along its axis causes the knob 44 to depress the key directly beneath it (the "5" key in this particular embodiment, but it may be another key depending on the keyboard layout). To eliminate this function, the knob 44 may be fully enclosed in the housing to permit only its rotation.

The fingers 24 shown in the embodiment of FIG. 4 are mounted by way of pivot pins 49 extending from each side of each finger. The fingers are mounted diagonally, i.e., at an angle with respect to the center line 35. Thus, when the inner end 36 of a finger is pushed outward, the finger pivots at the pivot pin 49 causing the outer end 37 of the finger to rotate downward toward the key directly below it, depressing the key. Pivoting of the fingers is controlled by the control shaft 23, which itself pivots outward along a slot 50 extending from the central opening 40 in the upper surface 41 of the housing, as shown in the dashed lines. When pivoted in this manner, the control shaft engages the inner end 36 of the finger 24 lying underneath the slot, to push the inner end outward and rotate the finger to the position shown in the dashed lines, depressing the corresponding key. A resilient retainer 51 such as an elastic band encircles all of the fingers toward their inner ends to urge them inward upon release of the control shaft, thereby holding the outer ends 37 of the fingers above and clear of the keys.

Figure 12:
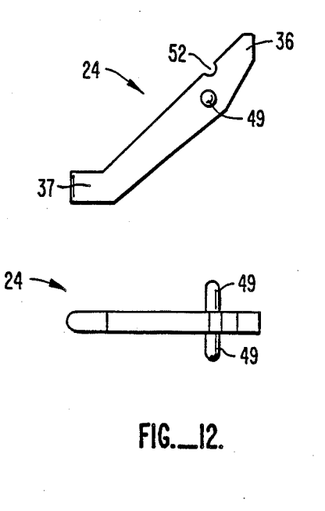
FIG. 12 is an illustration of one of two types of fingers included in the embodiment shown in FIG. 8, in a side elevation view and a view from above.

One such finger is shown in FIG. 12 in side and top views. From the side view a groove 52 may be seen for receiving the elastic band. The top view illustrates the pivot pins 49 extending outward from both sides of the finger.

In the embodiment shown in FIG. 4, the housing 22 is constructed in three parts, including an upper portion 60, a lower portion 61 and a retaining disk 62. These parts are shown in detail in FIGS. 5 through 7.

Figure 5A:
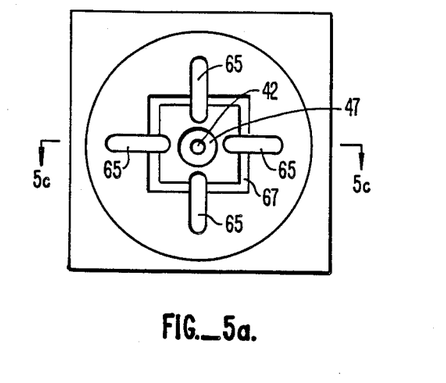
Figure 5B:
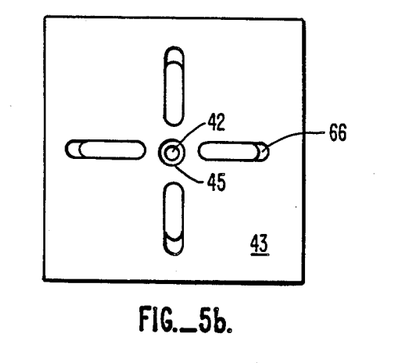
Figure 5C:
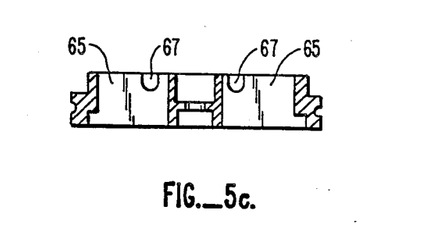

FIGS. 5a, 5b and 5c illustrate the lower portion, in top, bottom and cutaway views. Passing all the way through the lower portion are the central opening 42 and four radial slots 65. The slots 65 permit passage of the two longitudinal and lateral fingers. Each slot has an inverted shoulder 66 at its outer end, opening to the bottom surface 43 of the housing. These inverted shoulders 66 accommodate the outer ends of the fingers which are angled with respect to the fingers themselves to lie in the horizontal plane when the fingers are in repose (see FIG. 4). This lower portion of the housing also contains grooves 67 in its top surface, extending perpendicularly from each slot 65. These grooves receive the pivot pins 49 of the fingers.

Figure 6:
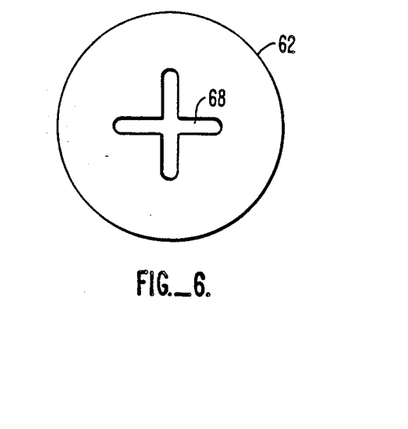
FIG. 6 is a top view of a retaining disk forming part of the housing of the embodiment shown in FIG. 4.

The retaining disk 62 is shown in FIG. 6. The disk contains slots 6B corresponding to the slots 65 in the lower portion of the housing, and superimposed over the latter when the parts are assembled. The retaining disk closes the tops of the grooves 67 (FIGS. 5a and 5c) to retain the pivot pins 49 of the fingers.

Figure 7A:
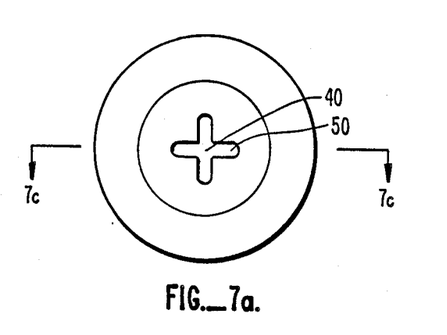
Figures 7B, 8:
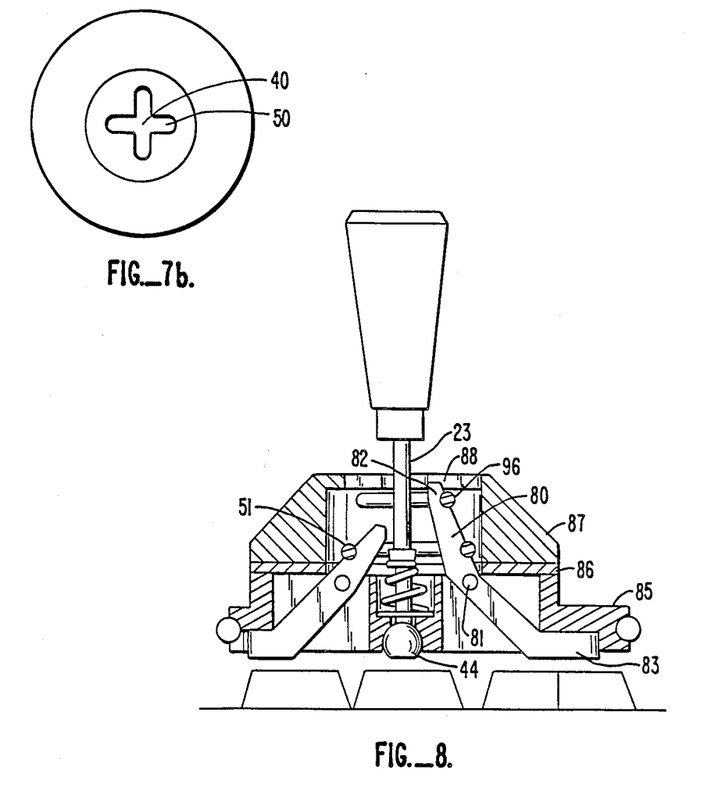
Figure 7C:
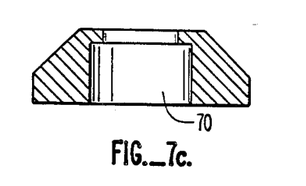

The upper portion 60 of the housing is shown in FIGS. 7a, 7b and 7c, in top, bottom and cutaway views. The central opening 40 and radial slots 50 extend all the way through the upper portion, and are sized to loosely accommodate the control shaft. These slots serve as guides for the pivoting motion of the control shaft, directing it to pivot in the direction of any of the four fingers, and substantially preventing it from pivoting in any other direction. The interior 70 of this upper portion of the housing is hollow, permitting free movement of the inner ends of the fingers as well as accommodating the elastic band which encircles the fingers.

A somewhat more complex and more versatile embodiment of the invention is shown in FIG. 8. This embodiment contains eight fingers rather than four. mounted according to the arrangement shown in FIG. 3. The view in FIG. 8 is a cutaway view taken along the line 8—8 in FIG. 2.

The embodiment of FIG. 8 incorporates the features of that of FIG. 4, with four additional fingers positioned diagonally to depress the four corner keys ("End," "Home," "PgUp" and "PgDn"). These corner key fingers 80, shown in FIG. 8 as well as FIG. 13, operate on the same principle as the arrow key fingers 24 shown in FIGS. 4 and 12, with pivot pins 81 corresponding to the pivot pins 49 of the arrow key fingers, and inner and outer ends 82, 83 functioning in the same manner as their counterparts in the arrow key fingers. It will be noted that the upper surface of the knob 44 is round rather than flat as in the FIG. 4 embodiment.

As before, the housing has a lower portion 85, a retaining disk 86 and an upper portion 87, similar to those in the FIG. 4 embodiment. These are depicted in FIGS. 9, 10 and 11, respectively.

Figure 9A:
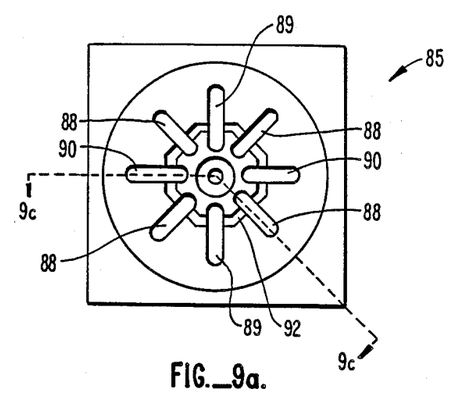
Figure 9B:
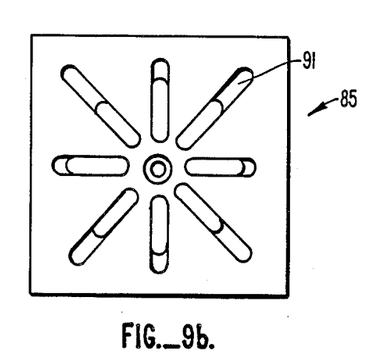
Figure 9C:
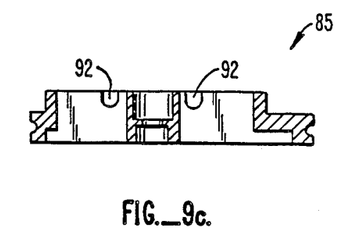
Figure 13:
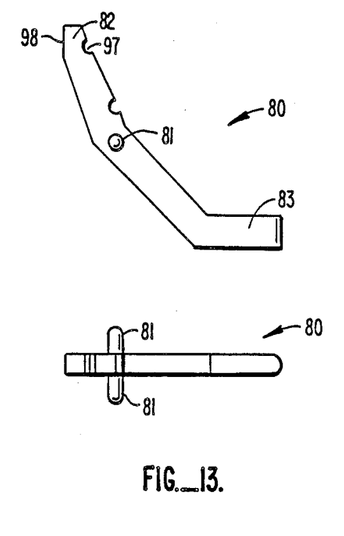
FIG. 13 illustrates the other type of finger shown in FIG. 8, in similar views.

As shown in FIG. 9a and 9b, the lower portion B5 contains corner slots 88 along the two diagonals, in addition to the longitudinal and lateral slots 89, 90. Like the longitudinal and lateral slots, the corner slots have inverted shoulders 91 to engage the extended outer ends of the corner key fingers. The grooves 92 extend sideways from each slot to receive the pivot pins 81 (FIG. 13).

Figure 10:
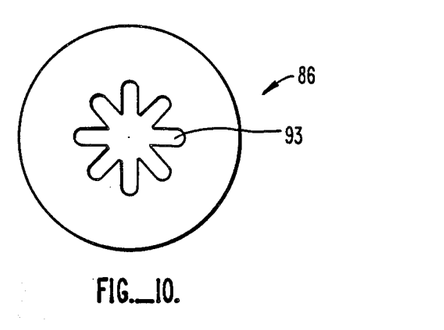
FIG. 10 is a top view of a retaining disk used in connection with the embodiment of FIG. 8.

The retaining disk 86 in FIG. 10 encloses the tops of these grooves to retain the pins. Slots g3 in the retaining disk provide through passages for all eight fingers.

Figure 11A:
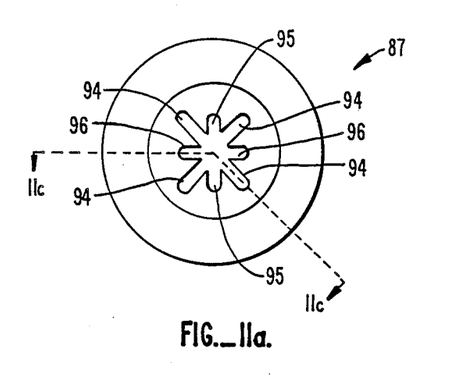
Figure 11B:
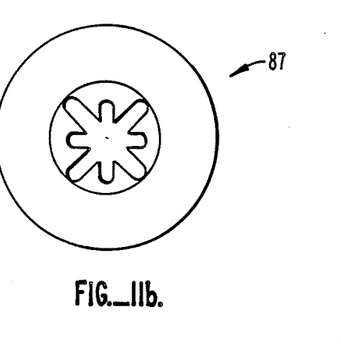
Figure 11C:
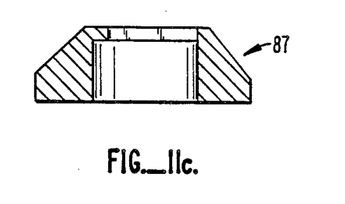

The upper portion 87 of the housing, shown in FIGS. 11a, 11b and 11c, in top, bottom and sectional views, respectively, likewise contains eight slots rather than four, permitting pivoting of the control shaft in any of eight directions. The corner slots 94 in this upper housing portion are longer than the longitudinal and lateral slots 95, 96 as an optional means of requiring greater effort on the part of the user to use these corner functions, thereby avoiding the inadvertent depressing of an undesired key.

In the eight-finger embodiment, structures which differentiate between the longitudinal and lateral fingers on the one hand and the corner key fingers on the other in terms of the feel to the user provide a further advantage in increased accuracy of use. The ability to differentiate by feel provides the user with a means of avoiding pivoting the control shaft in an unintended direction.

In the embodiment shown in FIG. 8, this differential feel is provided in part by a second elastic band 96 inside the housing, this second band contacting only the corner key fingers 80. As shown in FIGS. 8 and 13, this second band is held in place by an upper groove 97 in each finger toward its inner/top end. To avoid contact of this second band with the longitudinal and lateral fingers 24, these corner key fingers are longer than the latter, with their inner ends 82 extending higher than the inner ends of the longitudinal and lateral fingers. The second band 96 is placed high enough to clear the longitudinal and lateral fingers, such that the only resistance which they encounter is that supplied by the first elastic band 51.

Also contributing to the preference of the control shaft for the arrow key fingers is the fact that the inner ends of the corner key fingers extend upward into the corner slots 88 in the upper portion of the housing, thus inhibiting the entry of the control shaft into these corner slots. Although the corner key fingers will retract when forced backward by the control shaft, they offer sufficient resistance that a conscious effort on the part of the user will be required to pivot the control shaft into these slots. Without such an effort, the control shaft will tend to slide over the corner slot entrances, and pass readily from one arrow key slot to the next. The inner face 98 (FIG. 13) of a typical corner key finger (i.e., the face contacting the control shaft 23), will be contoured flat in these embodiments to guide the control shaft past it in a smooth movement.

In addition, the raised inner ends 82 of the corner key fingers also raise the location at which contact is made between these fingers and the control shaft 23. Due to the location of the control shaft pivot point at the bottom of the housing, the higher contact points require one to pivot the control shaft by a greater angle in order to actuate these fingers.

The foregoing is offered primarily for purposes of illustration. It will be readily apparent to those skilled in the art that the elements of construction described herein and their function may be further varied, modified or substituted without departing from the spirit and scope of the invention.

What is claimed is:

1. A manual actuator for arrow keys arranged on a data input keyboard in accordance with a standard array comprised of four arrow keys arranged in a cross and four corner keys at the four corners thereof, said manual actuator comprising:
    a housing;
    eight fingers pivotally mounted in said housing and arranged according to said standard array, each said finger having an inner end and an outer end and mounted such that said outer end is displaced downward below said bottom surface of said housing upon pivoting of said finger, said eight fingers comprising four arrow fingers arranged to align said outer ends thereof with said arrow keys and four corner key fingers arranged to align said outer ends thereof with said corner keys when said housing is positioned over said keyboard;
    first biasing means for biasing said outer ends of said arrow fingers upward;
    second biasing means for biasing said outer ends of said corner key fingers upward, said second biasing means providing stronger resistance than said first biasing means;
    a control shaft mounted in said housing in pivotal manner toward said fingers such that engagement of said control shaft with any said finger causes said finger to move downward below said housing; and
    means for stably mounting said housing to a keyboard.

2. A manual actuator in accordance with claim 1 in which said housing has a center line and said fingers extend radially from said center line.

3. A manual actuator in accordance with claim 1 further comprising means for biasing said control shaft toward said center line.

4. A manual actuator in accordance with claim 1 further comprising means for guiding said control shaft to substantially prevent pivoting thereof in directions other than toward said fingers.

5. A manual actuator in accordance with claim 1 in which said mounting means includes housing height adjustment means and means for forward and backward position adjustment of said housing with respect to said keyboard.

6. A manual actuator in accordance with claim 1 in which said fingers are mounted at an angle with respect to said center line so that horizontal displacement of said inner ends thereof away from said center line causes vertical displacement of said outer ends thereof downward.

7. A manual actuator in accordance with claim 1 in which said standard array further comprises a center key at the center of said cross, and said control shaft is movable along said center line to depress said center key when said center line is aligned therewith.

8. A manual actuator in accordance with claim 7 further comprising a spring biasing said control shaft upward.

9. A manual actuator in accordance with claim 1 in which said housing has top and bottom surfaces and a center line perpendicular thereto, and said arrow fingers and said corner key fingers are mounted at an angle with respect to said center line so that horizontal displacement of said inner ends thereof away from said center line causes vertical displacement of said outer ends thereof downward.

10. A manual actuator in accordance with claim 9 further comprising a central opening in said top surface of said housing to permit passage of said control shaft and a plurality of slots extending radially therefrom to guide said control shaft to substantially prevent pivoting thereof in directions other than toward said fingers.

11. A manual actuator in accordance with claim 10 in which said slots have inner ends opening into said central opening, and said second biasing means biases said inner ends of said corner key fingers to said inner ends of said slots.

12. A manual actuator in accordance with claim 1 in which said inner ends of said corner key fingers extend above said inner ends of said arrow fingers, and said second biasing means comprise a resilient member engaging said inner ends of said corner key fingers at a level above said inner ends of said arrow fingers.

13. A manual actuator in accordance with claim 1 in which said inner ends of said corner key fingers extend above said inner ends of said arrow fingers, and said second biasing means comprise a resilient band encircling said inner ends of said corner key fingers at a level above said inner ends of said arrow fingers.

14. A manual actuator for arrow keys arranged in a cross on a keyboard with a center key at the center thereof and four corner keys at the four corners thereof, said manual actuator comprising:

a housing having top and bottom surfaces and a center line perpendicular thereto;

a plurality of fingers pivotally mounted in said housing, extending radially from said center line, each said finger having an inner end and an outer end and mounted such that said outer end is displaced downward below said bottom surface of said housing upon pivoting of said finger, said fingers comprising four arrow fingers forming a second cross superimposed over said first cross, and four corner key fingers forming a third cross coaxial with said first and second crosses but rotated approximately 45° with respect thereto such that said outer ends of said arrow fingers are aligned with said arrow keys and said outer ends of said corner key fingers are aligned with said corner keys when said center line is aligned with said center key;

a control shaft mounted in said housing in coaxial relation with said center line in pivotal manner toward said fingers, whereby pivoting said control shaft to engage the inner end of any selected finger causes pivoting of said finger to lower the outer end thereof, said control shaft being movable along said center line to depress said center key when said center line is aligned therewith;

first biasing means for biasing said outer ends of said fingers upward;

second biasing means for biasing said control shaft toward said center line and upward, said second biasing means providing greater resistance than said first biasing means; and means for stably mounting said housing to a computer keyboard with said outer ends of said fingers in alignment with said arrow keys.

* * * * *